United States Patent
Tanaka et al.

[15] 3,655,514

[45] Apr. 11, 1972

[54] PROCESS FOR PURIFYING L-ASPARAGINASE

[72] Inventors: Masao Tanaka, Machida-shi; Tsuneo Kagawa, Sunto-gun, Shizuoka-ken; Kazuo Mochizuki, Sunto-gun, Shizuoka-ken; Masahiro Kohagura, Sunto-gun, Shizuoka-ken, all of Japan

[73] Assignee: Kyowa Hakko Kogyo Co., Ltd., Tokyo, Japan

[22] Filed: June 11, 1969

[21] Appl. No.: 832,454

[30] Foreign Application Priority Data

June 12, 1968 Japan...................................44/39934

[52] U.S. Cl. ........................................................195/66 A
[51] Int. Cl..........................................................C07g 7/028
[58] Field of Search ...............................................195/66 A

[56] References Cited

UNITED STATES PATENTS 3,440,142  4/1969  Teller ......................................195/66

OTHER PUBLICATIONS

Roberts et al., Journal of Bacteriology, Vol. 95, pp. 2117–2123, June 1968

*Primary Examiner*—Lionel M. Shapiro
*Attorney*—Craig, Antonelli and Hill

[57] ABSTRACT

In a process for purifying an enzymatic preparation of L-asparaginase obtained from an L-asparaginase-producing micro-organism belonging to the genus Serratia wherein said micro-organism produces, together with the L-asparaginase, factors which inactivate the enzymatic activity of L-asparaginase, the improvement which comprises inhibiting the L-asparaginase inactivating factors and thus stabilizing the L-asparaginase preparation during the purification process by adding to said enzymatic preparation a heavy metal ion such as silver, cadmium, copper or zinc, and recovering purified L-asparaginase having an effective anti-tumor activity.

9 Claims, No Drawings

PROCESS FOR PURIFYING L-ASPARAGINASE

The present invention relates to a process for obtaining an anti-tumor enzymatic preparation of high purity by purifying a crude enzyme of L-asparaginase obtained from cultured cells of a microorganism which produces an anti-tumor L-asparaginase. More particularly, the present invention is directed to producing a purified anti-tumor enzymatic preparation of L-asparaginase economically and on an industrial scale by purifying crude asparaginase at a good yield rate.

L-asparaginase, that is, L-asparagine-amide hydrolase (having the enzyme number 3, 5, 1, 1), is an enzyme which hydrolyzes L-asparagine into L-aspartic acid and ammonia. It is relatively extensively distributed in the animal and plant worlds. However, many of the details of its properties are unknown. Much attention is being directed toward this enzyme since it has been recently revealed that specific types of the present enzyme, for example L-asparaginase produced by a serum from guinea pigs or by *Escherichia coli*, have a remarkable effect against acute leukemia.

However, many problems stand in the way to the practical production, that is, the mass production of the present enzyme, because the enzyme having the anti-tumor effect was limited in its types and therefore the supply of the enzymatic sources was inadequate. Furthermore, it was difficult to purify the crude enzyme to a preparation usable as a pharmaceutical. Accordingly, a solution for these problems has been sought.

With respect to the problem of the enzymatic source, the applicants have filed an application directed to an agitated aerobic cultivation of a microorganism belonging to the genus Serratia (U.S. Pat. application Ser. No. 798,443 filed on Feb. 11, 1969, now abandoned). The applicants have continued their basic research with respect to the purification process and thus have developed a novel process to overcome the problem of purification.

Heretofore, it was known that an anti-tumor L-asparaginase produced by microorganisms is, by nature, stable in a wide range of pH values and temperatures. However, the stability of a preparation in its partially purified stage was extremely bad and accordingly an unexpected loss of the activity occurred during the purification steps. Therefore, it was extremely difficult to obtain a highly purified preparation on an industrial scale and in a good yield rate, because it was essential to carry out all the processings very rapidly. No definite answer was given for the causes of this instability phenomenon. In investigating the causes of this loss of activity, it has been found that a relatively strong L-asparaginase inactivating factor is simultaneously produced in the cell when L-asparaginase is produced and the activity of L-asparaginase is lost because this inactivating element is extracted together with L-asparaginase when the cell is destroyed. Therefore, unless this element is removed, it is not only impossible to obtain the desired purified L-asparaginase preparation, but also an effective anti-tumor result cannot be obtained from an enzymatic preparation containing these inactivating factors, even if such purified preparation is obtained.

An object of the present invention is to avoid the prior art disadvantages in the purification of an enzymatic preparation of L-asparaginase.

Another object of the present invention is to provide an improved process for purifying an enzymatic preparation of L-asparaginase having anti-tumor activity on an economic and industrial scale.

A further object of the present invention is to provide an improved process for purifying an enzymatic preparation of L-asparaginase which inhibits the activity of L-asparaginase inactivating factors and thus stabilizes the L-asparaginase preparation during the purification process.

Other objects and further scope of applicability of the present invention will become apparent from the detailed description given hereinafter; it should be understood, however, that the detailed description and specific examples, while indicating preferred embodiments of the present invention, are given by way of illustration only, since various changes and modifications within the spirit and scope of the invention will become apparent to those skilled in the art from this detailed description.

Pursuant to the present invention it has been discovered that the purification of the present enzyme can be effectively accomplished by preventing the L-asparaginase inactivating elements from exercising their activity while at the same time not impairing the activity of L-asparaginase. Thus, the present invention has succeeded in establishing an industrial process for producing L-asparaginase. This discovery was heretofore unknown and the present invention is a novel purification process of L-asparaginase based on this new finding.

The process for purifying L-asparaginase according to the present invention comprises inhibiting the activity of the inactivating factors and thus purifying the desired L-asparaginase in a good yield rate. The process is accomplished while purifying L-asparaginase obtained from cells of an L-asparaginase-producing microorganism. Said inhibition of the inactivating activity is achieved in the present invention by adding a heavy metal ion to the crude enzymatic solution at an appropriate period of the purification process, namely, at a stage where the L-asparaginase inactivating elements coexist with L-asparaginase and where the desired enzyme tends to lose its activity.

The heavy metal ions used in the present invention as the inactivating factor inhibitors include various metal ions, including heavy metal members of Groups I and II of the periodic table. Silver, cadmium, copper and zinc are particularly effective in the present invention. These metals are used in the form of an inorganic or organic acid salt, such as chlorides, sulfates, nitrates, acetates and the like. Enzymatic samples which are effectively treated with an addition of metal ions include a cell extract liquid, a crude enzymatic liquid obtained by subjecting said cell extract liquid to a process for removing nucleic acids or to an acidic precipitation process, said precipitation process being previously invented by the present applicants (U.S. Pat. application, Ser. No. 826,665 filed on May 21, 1969). Also, in a higher purification stage, a more remarkable effect is recognized when the preparation to be used contains inactivating factors. The concentration of the metal ions differs depending on the amount of inactivating factors present, but a concentration in the range of about $10^{-3}$ to $10^{-6}$ M and even higher is appropriate. An excessively high concentration of metal ions inhibits the activity of L-asparaginase itself. These metal ions can be easily removed by an ion exchange process or by dialysis after the inactivating factors are separated from L-asparaginase. The activity of the inactivating factors can be completely inhibited by this addition of metal ions. Thus, L-asparaginase can be purified under an extremely stable condition and the desired enzyme can be purified in a high yield rate, making it possible to obtain a high-purity preparation.

In the following, an actual case is described wherein the activity of the inactivating factors is inhibited by the addition of a heavy metal ion. The action of the L-asparaginase inactivating factors is strong even at low temperatures of from 0° – 15° C. and is active in a wide pH range of about 4.0 – 8.5. In particular, the strongest activity is shown at a pH value of about 5.5. Because of this, an L-asparaginase enzymatic preparation containing the inactivating elements is extremely unstable in its aqueous solution state in the purification steps of L-asparaginase under the above-stated conditions.

The following table shows the rate of the retained activity of L-asparaginase as measured from samples after various heavy metal salts were added at a concentration of $10^{-3}$ M. Said samples of enzymatic aqueous solutions contain the inactivating factors of L-asparaginase produced by *Serratia marcescens* ATCC 60. The samples were allowed to stand for 2 hours at 370° C. in the pH value specified in the table.

TABLE

Effect of Heavy Metal Ions on the Stability of L-asparaginase

| Additives | pH 9.0 | Survival Rate of (%) L-asparaginase pH 7.5 | pH 5.5 |
|---|---|---|---|
| No additives | 98 | 5 | 0 |
| $CuSO_4$ | 100 | 98 | 80 |
| $AgNO_3$ | 98 | 100 | 105 |
| $Cd(NO_3)_2$ | 95 | 105 | 90 |
| $ZnCl_2$ | 101 | 88 | 65 |
| $Hg_2Cl_2$ | 80 | 65 | 30 |
| NaCl | 95 | 10 | 2 |
| $Na_2SO_4$ | 95 | 11 | 0 |
| $KNO_3$ | 96 | 4 | 0 |

As is clear from the above table, the heavy metal ions and particularly copper, silver, cadmium and zinc strongly inhibit the activity of the inactivating elements even at a pH value of 5.5 which is the most favorable pH concentration for said inactivating elements, thus preventing L-asparaginase from losing its activity. The effect of these additives is also recognized when they are used in a concentration of $10^{-6}$ M or higher as stated previously. The purity of the thus-obtained preparations wherein the activity of the inactivating elements is inhibited can be further raised by various methods commonly employed for enzymatic purification, for instance, by ion-exchange chromatography, adsorption chromatography and the like. In this way, preparations usable as pharmaceuticals can be obtained in a good yield rate.

In the following examples of the present invention are shown, but these are merely illustrative of the present invention and should not be considered as limiting.

EXAMPLE 1

*Serratia marcescens* ATCC. 60 is cultivated in a liquid medium. The thus-grown cells are separated by centrifugation, whereby wet cells are obtained. The wet cells are suspended in a 0.01 M tris-buffer solution having a pH value of 8.5. The suspension is treated with a ultrasonic wave generator of 10 KC for 10 minutes. After the suspension is subjected to centrifugal separation, a supernatant liquid is collected to obtain a crude enzymatic solution having an L-asparaginase activity showing a specific activity of 0.15 unit per 1 mg. of protein (this unit is an international unit showing the enzymatic activity by the amount of the substrate L-asparagine in $\mu$ M units to be hydrolyzed for 1 minute and the same representation for the specific activity will be used hereinafter). To this supernatant extract, copper sulfate is added and dissolved to a concentration of $10^{-3}$ M, whereby the activity of the inactivating elements is inhibited. Thereafter, manganese chloride is added to a concentration of 0.05 M and the resultant liquid is heated for 5 minutes at 50° C. and the formed precipitates are removed by centrifugal separation, whereby a crude enzymatic liquid having a specific activity of 0.4 is obtained. This enzymatic liquid is subjected to a salting-out treatment by adding ammonium sulfate in a range of concentration of about 0.3 to 0.7 saturation at 0° C. Precipitates which are salted out are recovered by centrifugal separation, whereby a crude enzymatic protein is obtained. In a 0.05 M tris-buffer solution having a pH of 8.5 containing copper sulfate in a concentration of $10^{-3}$ M, 20 g. by weight of this crude enzymatic protein is dissolved and subjected to dialysis with a buffer solution of the same composition. Thereafter, said enzymatic protein is adsorbed by DEAE-cellulose (diethyl amino ethylcellulose) and subjected to chromatography using an aqueous solution of sodium chloride containing copper ions, whereby a division of a high-purity L-asparaginase activity is separated. This eluted division no longer contained the inactivating factors. The L-asparaginase remains extremely stable after copper ions are removed by dialysis.

This partially purified enzyme is further purified by another chromatography treatment with DEAE-cellulose, chromatography with biogel P-150 or the like, whereby purified asparaginase containing a specific activity of 110 in a yield rate of 30 percent is obtained. This L-asparaginase preparation showed an anti-tumor activity which cured completely an experimental leukemia of a mouse with a dosage of several $\mu$ g.

EXAMPLE 2

Cells obtained by cultivating *Serratia marcescens*, ATCC 19180 are treated in the same manner as in the Example 1, whereby an extract liquid is obtained. To this extract, silver nitrate is added to a concentration of $10^{-3}$ M. Said extract liquid is then purified in the same steps as in Example 1 except that copper sulfate of the Example 1 is replaced with silver nitrate. An enzymatic preparation of L-asparaginase containing a specific activity of 105 is obtained in a yield rate of the activity of 35 percent. This preparation is also effective against an experimental leukemia of a mouse.

The invention being thus described, it will be obvious that the same may be varied in many ways. Such variations are not to be regarded as a departure from the spirit and scope of the invention and all such modifications as would be apparent to one skilled in the art are intended to be included.

What is claimed is:

1. In a process for purifying an enzymatic preparation of L-asparaginase obtained from an L-asparaginase-producing microorganism belonging to the genus Serratia, wherein said microorganism produces, together with the L-asparaginase, factors which inactivate the enzymatic activity of L-asparaginase, the improvement which comprises inhibiting the inactivating factors and thus stabilizing the L-asparaginase preparation during the purification process by adding to said enzymatic preparation about $10^{-3}$ to $10^{-6}$M of at least one heavy metal ion selected from the group consisting of silver, cadmium, copper and zinc, and then recovering L-asparaginase from the resultant mixture.

2. The process of claim 1, wherein the heavy metal ion is added to a partially purified L-asparaginase enzymatic solution.

3. The process of claim 2, wherein the partially purified L-asparaginase enzymatic solution is obtained by adding manganese ions to a cell extract of said Serratia microorganism.

4. The process of claim 2, wherein the partially purified L-asparaginase enzymatic solution is obtained by acidifying a cell extract of said Serratia microorganism.

5. The process of claim 1, wherein the heavy metal ion is added to the enzymatic preparation in the form of a chloride, sulfate, nitrate or acetate salt.

6. The process of claim 5, wherein the heavy metal salt is selected from the group consisting of copper sulfate, silver nitrate, cadmium nitrate and zinc chloride.

7. The process of claim 1, wherein the heavy metal ions are added to the enzymatic preparation in the form of an organic or inorganic acid salt.

8. The process of claim 1, wherein the microorganism is *Serratia marcescens*, ATCC. 60.

9. The process of claim 1, wherein the microorganism is *Serratia marcescens*, ATCC. 19180.

* * * * *